(12) United States Patent
Paek et al.

(10) Patent No.: US 7,734,471 B2
(45) Date of Patent: Jun. 8, 2010

(54) ONLINE LEARNING FOR DIALOG SYSTEMS

(75) Inventors: Timothy S. Paek, Sammamish, WA (US); David M. Chickering, Bellevue, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1166 days.

(21) Appl. No.: 11/170,999

(22) Filed: Jun. 29, 2005

(65) Prior Publication Data

US 2006/0206337 A1 Sep. 14, 2006

Related U.S. Application Data

(60) Provisional application No. 60/659,689, filed on Mar. 8, 2005.

(51) Int. Cl.
*G10L 21/00* (2006.01)
(52) U.S. Cl. .............. 704/270.1; 704/270; 704/275; 704/231; 704/235; 704/255; 704/256
(58) Field of Classification Search .............. 704/270, 704/270.1, 275, 255, 256, 256.2, 256.3, 231, 704/235
See application file for complete search history.

(56) References Cited

U.S. PATENT DOCUMENTS

| 4,228,496 | A | 10/1980 | Katzman et al. |
|---|---|---|---|
| 4,769,771 | A | 9/1988 | Lippmann et al. |
| 5,165,018 | A | 11/1992 | Simor |
| 5,274,821 | A | 12/1993 | Rouquie |
| 5,428,792 | A | 6/1995 | Conner et al. |
| 5,428,803 | A | 6/1995 | Chen et al. |
| 5,452,447 | A | 9/1995 | Nelson et al. |
| 5,493,692 | A | 2/1996 | Theimer et al. |
| 5,544,321 | A | 8/1996 | Theimer et al. |
| 5,555,376 | A | 9/1996 | Theimer et al. |
| 5,566,302 | A | 10/1996 | Khalidi et al. |
| 5,577,251 | A | 11/1996 | Hamilton et al. |
| 5,603,054 | A | 2/1997 | Theimer et al. |
| 5,611,050 | A | 3/1997 | Theimer et al. |
| 5,621,809 | A | 4/1997 | Bellegarda et al. |
| 5,664,173 | A | 9/1997 | Fast |
| 5,732,274 | A | 3/1998 | O'Neill |

(Continued)

FOREIGN PATENT DOCUMENTS

EP 0713257 5/1996

(Continued)

OTHER PUBLICATIONS

T. Joachims, Text categorization with support vector machines: learning with many relevant features, Machine Learning, European Conference on Machine Learning, Apr. 21, 1998, pp. 137-142.

(Continued)

*Primary Examiner*—Qi Han
(74) *Attorney, Agent, or Firm*—Lee & Hayes, PLLC (57) ABSTRACT

An online dialog system and method are provided. The dialog system receives speech input and outputs an action according to its models. After executing the action, the system receives feedback from the environment or user. The system immediately utilizes the feedback to update its models in an online fashion.

18 Claims, 8 Drawing Sheets

U.S. PATENT DOCUMENTS

| | | | |
|---|---|---|---|
| 5,787,251 | A | 7/1998 | Hamilton et al. |
| 5,806,060 | A | 9/1998 | Borgida et al. |
| 5,812,865 | A | 9/1998 | Theimer et al. |
| 5,826,269 | A | 10/1998 | Hussey |
| 5,864,810 | A * | 1/1999 | Digalakis et al. ............ 704/255 |
| 5,899,997 | A | 5/1999 | Ellacott |
| 5,950,196 | A | 9/1999 | Pyreddy et al. |
| 5,961,582 | A | 10/1999 | Gaines |
| 5,991,754 | A | 11/1999 | Raitto et al. |
| 5,995,959 | A | 11/1999 | Friedman et al. |
| 6,032,144 | A | 2/2000 | Srivastava et al. |
| 6,128,612 | A | 10/2000 | Brereton et al. |
| 6,144,999 | A | 11/2000 | Khalidi et al. |
| 6,163,856 | A | 12/2000 | Dion et al. |
| 6,173,266 | B1 | 1/2001 | Marx et al. |
| 6,182,061 | B1 | 1/2001 | Matsuzawa et al. |
| 6,253,181 | B1 * | 6/2001 | Junqua ...................... 704/255 |
| 6,389,393 | B1 | 5/2002 | Gong |
| 6,466,232 | B1 | 10/2002 | Newell et al. |
| 6,513,046 | B1 | 1/2003 | Abbott, III et al. |
| 6,516,322 | B1 | 2/2003 | Meredith |
| 6,523,026 | B1 | 2/2003 | Gillis |
| 6,523,027 | B1 | 2/2003 | Underwood |
| 6,549,915 | B2 | 4/2003 | Abbott, III et al. |
| 6,556,960 | B1 | 4/2003 | Bishop et al. |
| 6,584,459 | B1 | 6/2003 | Chang et al. |
| 6,598,169 | B1 | 7/2003 | Warwick et al. |
| 6,615,322 | B2 | 9/2003 | Arimilli et al. |
| 6,654,734 | B1 | 11/2003 | Mani et al. |
| 6,691,148 | B1 | 2/2004 | Zinky et al. |
| 6,747,675 | B1 | 6/2004 | Abbott et al. |
| 6,765,330 | B2 | 7/2004 | Chen et al. |
| 6,766,348 | B1 | 7/2004 | Combs et al. |
| 6,791,580 | B1 | 9/2004 | Abbott et al. |
| 6,799,162 | B1 * | 9/2004 | Goronzy et al. ............. 704/244 |
| 6,801,223 | B1 | 10/2004 | Abbott et al. |
| 6,812,937 | B1 | 11/2004 | Abbott et al. |
| 6,826,555 | B2 | 11/2004 | Nunez |
| 6,826,562 | B1 | 11/2004 | Leung et al. |
| 6,842,877 | B2 | 1/2005 | Robarts et al. |
| 6,845,507 | B2 | 1/2005 | Kenton |
| 6,910,068 | B2 | 6/2005 | Zintel et al. |
| 6,912,529 | B1 | 6/2005 | Kolfman |
| 6,944,184 | B1 | 9/2005 | Miller et al. |
| 6,950,821 | B2 | 9/2005 | Faybishenko et al. |
| 7,055,142 | B2 | 5/2006 | Meredith et al. |
| 7,089,294 | B1 | 8/2006 | Baskey et al. |
| 7,117,487 | B2 | 10/2006 | Meredith et al. |
| 7,143,167 | B2 | 11/2006 | Kampe et al. |
| 7,292,976 | B1 | 11/2007 | Hakkani-Tur et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2002/0143944 | A1 | 10/2002 | Traversat et al. |
| 2002/0147771 | A1 | 10/2002 | Traversat et al. |
| 2002/0169852 | A1 | 11/2002 | Schaeck |
| 2002/0184070 | A1 | 12/2002 | Chen et al. |
| 2003/0018694 | A1 | 1/2003 | Chen et al. |
| 2003/0046401 | A1 | 3/2003 | Abbott et al. |
| 2003/0058277 | A1 | 3/2003 | Bowman-Amuah |
| 2003/0126136 | A1 | 7/2003 | Omoigui |
| 2003/0154476 | A1 | 8/2003 | Abbott, III et al. |
| 2003/0163316 | A1 | 8/2003 | Addison et al. |
| 2003/0163461 | A1 | 8/2003 | Gudbjartsson et al. |
| 2003/0212540 | A1 | 11/2003 | Meredith et al. |
| 2003/0212671 | A1 | 11/2003 | Meredith et al. |
| 2003/0212672 | A1 | 11/2003 | Meredith et al. |
| 2003/0212761 | A1 | 11/2003 | Meredith et al. |
| 2004/0148363 | A1 | 7/2004 | Hadi |
| 2004/0181390 | A1 | 9/2004 | Manson |
| 2005/0033582 | A1 | 2/2005 | Gadd et al. |
| 2005/0034078 | A1 | 2/2005 | Abbott et al. |
| 2005/0125232 | A1 * | 6/2005 | Gadd ...................... 704/270.1 |
| 2006/0058999 | A1 | 3/2006 | Barker et al. |
| 2006/0195321 | A1 * | 8/2006 | Deligne et al. .............. 704/257 |

FOREIGN PATENT DOCUMENTS

| | | |
|---|---|---|
| WO | 9800787 | 1/1998 |

OTHER PUBLICATIONS

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

U.S. Appl. No. 11/170,584, filed Jun. 29, 2005, Paek, et al.

U.S. Appl. No. 11/170,998, filed Jun. 29, 2005, Paek, et al.

U.S. Appl. No. 11/169,503, filed Jun. 29, 2005, Chickering, et al.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 28-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

Lee, Wayne. "Decision Theory and Human Behavior." (1971) John Wiley & Sons, Inc. New York.

Boutilier, C., Dean T., and Hanks, S. "Decision-theoretic planning: Structural assupmtions and computatonal leverage." Journal of Artificial Intelligence Research, (1999). pp. 1-93, vol. 1:1.

Cooper, G. F. "A method for using belief networks as influence diagrams." Proceedings of the Ninth Conference on Uncertainty in Artificial Intelligence, Washington, D.C. (1993). pp. 55-63.

Dearden, R., Friedman, N., and Russell, S. "Bayesian Q-learning." Proceedings of the Fifteenth National Conference on Artificial Intelligence, (1998). pp. 761-768.

Heckerman, D. "A Bayesian approach for learning casual networks." Proceddings of the Eleventh Conference on Uncertainity in Artificial Intelligence, Montreal. (1995).

Heckerman, D. "A tutorial on learning Bayesian networks." Technical Report MSR-TR-95-06, Microsoft Research, Mar. 1995 (Revised Nov. 1996).

Kaelbling, L. P., Littman, M. L. and Morre, A. W. "Reinforcment learning: A survey." Journal of Articial Intelligence Research, (1996). pp. 237-285, vol. 4.

Lauritzen, S. L. and Nilsson, D. "Representing and solving decisions problems with limited information." Management Science, (2001). pp. 1235-1251, vol. 47.

Singh, S., Litman, D., Kearns, M., and Walker, M. "Optimizing Dialogue management with reinforcement learning: Experiments with the nj-fun system." Journal of Artificial Intelligence Research, (2002). pp. 105-133. vol. 16.

Tatman, J. A. and Shachter, R.D. "Dynamic programming and influence diagrams." IEEE Transactions on Sysytems, Man and Cybernetics, (1990). pp. 365-379. vol. 20.

Thompson, W. R. "On The Liklihood That One Unknown Probability Exceeds Another In View of the Evidence of Two Samples." Biometricka, (1933). pp. 285-294.

Wyatt, J. PhD thesis, University of Edinburgh. Exploration and Inference in Learning from Reinforcement, (1997).

Young, S. "Problilistic Methods in Spoken Dialogue Systems." Philosophical transactions of the Royal Society (Series A), (2000), pp. 1389-1402.

Thompson, W. R. "On the theory of apportionment." American Journal of Math, (1935). vol. 57, pp. 285-294.

Marilyn Walker, "An Application of Reinforcement Learning to Dialogue Strategy Selection in a Spoken Dialogue System for Email", pp. 387-416, 2000.

Matthew Stone, "Foundations of Language Interaction", pp. 1-4, 2001.

Tim Paek, et al., "On the Utility of Decision-Theoretic Hidden Subdialog", 2003.

Eric Horvitz, et al., "Harnessing Models of Users' Goals to Mediate Clarification Dialog in Spoken Language Systems", 2001.

Satinder Singh, et al., "Reinforcement Learning for Spoken Dialogue Systems", 2000.

OA Dated Feb. 11, 2009 for U.S. Appl. No. 11/170,998, 57 pages.

OA Dated Oct. 28, 2008 for U.S. Appl. No. 11/169,503, 11 pages.

OA Dated Jan. 9, 2009 for U.S. Appl. No. 11/169,503, 14 pages.

Non-Final Office Action in U.S. Appl. No. 11/170,584, dated Dec. 24, 2008, 32 pages.

U.S. Appl. No. 11/169,503, filed Jun. 29, 2005, Chickering, et al., "Action selection for reinforcement learning using influence diagrams".

U.S. Appl. No. 11/170,584, filed on Jun. 29, 2005, Pack et al., "Easy generation and automatic traning of spoken dialog systems using text-to-speech".

U.S. Appl. No. 11/170,999, filed on Jun. 29, 2005, Pack et al. "Online learning for dialog systems".

Abramsky, "Computational Interpretations of Linear Logic" Theoretical Computer Science 111(1-2). 1993, 53 pages.

Berger, et al., "Sequentiality and the pi.Calculus" Abramsky, S. (ed.) Proceedings: Typed Lamixia Calculi and Applications, 5th Int'l Conference, Krakow, Poland, May 2-5, 2001, 56 pages.

Bray et al., "Extensible Markup Language (XML) 1.0 (Second Edition)" Oct. 8, 2000, <http://www.w3.org/TR/20000/REC.xml-20001008.html>, 50 pages.

Chaudhuri, et al., "A Robust. Optimization-Base Approach for Approximate Answering of Agregate Queries", ACM. May 2001, 12 pages.

Cleveland et al., "An Operational Framework for Value-Passing Processes" Feb. 1994, Proceedings of the 21st ACM SIGPLAN-SIGACT symposium on Principles of programming languages, p. 326-338.

Feijs, "Modeling Microsoft COM Using pi. Calculus", Lecture Notes in Computer Science, vol. 1709. 1999. pp. 1343-1363. 31 pages.

Fournel, et al., "A Calculus of Mobile Agents," 1996. <http://citeseer.ist.psu.edu/focumet96calculus.html>. Last accessed Sep. 7, 2007. 16 pages.

Fournel, et al., "The join calculus: a language for distributed mobile programming" Sep. 2000. <http://citeseer.ist.psu.edu/432452.html>. Last accessed Sep. 7, 2007. 36 pages.

Haas, et al., "Etensible Query Processing in Starburst" ACM. Jun. 1989. 12 pages.

Honda, et al., "A Uniform Type Structure for Secure Information Flow", Jan. 2002 ACM SIGPLAN Notices, Proceedings of the 29th ACM SIGPLAN-SIGACT symposium on Principles of programming languages POPL '02. vol. 37 Issue 1.

Lee, et al., "On Modeling Real-time Mobile Processes", Jan. 2002, Australian Computer Science Communcations, Proceedings of the twenty-fifth Australiasian conference on Computer science - vol. 4 CRPITS '02. vol. 24 Issue 1. p. 139-147.

Mehia, "BizTalk Server 2000 Business Process Orchestration" 2001. <http://sites.computer.org/debull/AO1mar/mehia.ps> Last accessed Sep. 7, 2007. 6 pages.

Microsoft, "What's New in the Apr. 2001 Microsoft XML. Parser 4.0 Technology Preview" Apr. 2001. <http://msdn.microsoft.com/archive>, 3 pages.

Milner, "The Polyedic pi. Calculus: A Tutorial" Proceedings: Int'l Summer School on Logic Algebra of Specification. Markloberdorf. Germany. 1992. 50 pages.

Mohr, "Introduction to BizTalk Server 2000", 2000. <http://www.logxmit.comiconference/wrap2000_vegasitext/stephen_biztalk.pdf>, Last accessed Sep. 7, 2007. 10 pages.

OA Dated Dec. 24, 2008 for U.S. Appl. No. 11/170,584, p. 32.

OA Dated Feb. 11, 2009 for U.S. Appl. No. 11/170,998, 57 Pages.

OA Dated Feb. 19, 2009 for U.S. Appl. No. 11/170,999, 42 Pages.

OA Dated Jan. 9, 2009 for U.S. Appl. No. 11/169,503, 14 Pages.

OA Dated Oct. 28, 2009 for U.S. Appl. No. 11/169,503, 11 Pages.

Parson, "Using java Reflection to Autonate Extension Language Parsing" IEEE. Dec. 1999. 14 pages.

Peim, et al., "Query Processing with Description Logic Ontologies Over Object-Wrapped Databases" IEEE 2002. 10 pages.

Pericas-Geertsen. "XML-Fluent Mobile Agents" Dec. 2001. <http://citeseer.ist.psu.edulparicas-gestser99xmllucent.html>. Last accessed Sep. 7, 2007. 90 pages.

Risely, et al., "A Typed Language for Distributed Mobile Processes (Extended abstract)", Jan. 1998 Proceedings of the 25th ACM SIGPLAN-SIGACT symposium on Principles of programming languages. p. 378-390.

Tuatte, "XLANG. Web Services for Business Process Design" 2001. http//web.archive.org/web/20020207122217/http://www.goldotnet.com/team/xmlwsspecs/xlang-cidefault.htm. Last accessed Sep. 2, 2008. 35 pages.

Uranoto, et al., "Composition of Web Services Based on Their Behavioral Descriptions" Journal of Japanese Society for Artificial Intelligence. vol. 17, No. 4. The Japanese Society for Artificial Intelegence. Japan. Jul. 1, 2002. 10 pages.

Yoshida, et al. "Strong Normalisation in the pi. Calculus". MCS Technical Report, Sep. 2001. Mar201, 22 pages.

* cited by examiner

ONLINE LEARNING FOR DIALOG SYSTEMS

REFERENCE TO RELATED APPLICATIONS

This application claims the benefit of U.S. Provisional Application Ser. No. 60/659,689 filed on Mar. 8, 2005, and entitled SYSTEMS AND METHODS THAT FACILITATE ONLINE LEARNING FOR DIALOG SYSTEMS, the entirety of which is incorporated herein by reference.

BACKGROUND

Human-computer dialog is an interactive process where a computer system attempts to collect information from a user and respond appropriately. Spoken dialog systems are important for a number of reasons. First, these systems can save companies money by mitigating the need to hire people to answer phone calls. For example, a travel agency can set up a dialog system to determine the specifics of a customer's desired trip, without the need for a human to collect that information. Second, spoken dialog systems can serve as an important interface to software systems where hands-on interaction is either not feasible (e.g., due to a physical disability) and/or less convenient than voice.

Recently, researchers have investigated the use of reinforcement learning for optimal decision-making in spoken dialog systems. The goal of reinforcement learning algorithms is to learn a policy, a mapping from states to actions, which informs a system what it should do in any represented state of the dialog. In order to use these algorithms, dialog designers have had to either explicitly specify a reward function mapping states of the dialog to numeric values, and/or, conduct usability studies after a base system has been deployed to get numeric values for various states of the dialog from a user's subjective evaluations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An online learning dialog system and method are provided. In one example, the system and method can be employed with reinforcement learning. Reinforcement learning deals with learning how to act in an environment. One of the central problems in reinforcement learning is deciding when to explore and when to exploit. In particular, given a current state of an environment and given a model about the expected (short-term) reward for performing each action in that state, the system can "exploit" by performing the action that has the highest expected reward. On the other hand, because the model may be uncertain about the environment, the system can instead choose to perform a sub-optimal short-term action in order to gain information and improve the model for the long term ("explore").

The system can be employed to recognize spoken dialog using a speech model, for example, a voice-enabled browser. In this example, the browser can function like other web browser(s), except that it can respond to command-and-control speech recognition. For example, to go back to a previous web page, the user issues the voice command "go back" or "previous page".

An utterance produced by a speaker can either be accepted as understood, and consequently the corresponding action is taken, or the utterance can be deemed ambiguous and in need of clarification. When the system does not understand an utterance, the system can initiate a repair dialog, using one of two methods for clarification via the decision engine component: the decision engine model can ask for a repeat ("Can you repeat that?"), or for a confirmation ("Did you say X or Y?"). Repair dialogs are particularly important in noisy environments when speech recognition is often inaccurate.

The system can include a speech model that receives a speech input (e.g., raw voice signals) and outputs speech feature(s) (e.g., event(s)). The system can further include a decision engine model that receives the speech features and outputs an action to be taken. The decision engine model can employ a probability distribution associated with uncertainty regarding parameters of the decision engine model. The decision engine model selects an action based, at least in part, upon the probability distribution. The decision engine model can employ a heuristic technique to maximize long term expected utility. The system can further include a learning component that modifies, in an online manner, parameter(s) of the decision engine model based upon feedback associated with the selected action.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

An online learning dialog system and method are provided. The system can employ a method for learning optimal policies for a spoken dialog system as well as updating parametric models underlying the dialog system that proceeds in an "online" or incremental fashion.

Conventionally, spoken dialog systems update their models after receiving more data. Typically, a large amount of data is collected before either a new policy is learned using traditional reinforcement techniques and/or parameters are adjusted using supervised training. The system allows dialog systems to update their parameters and policy as soon as it receives data.

As noted previously, in one example, the system and method can be employed with reinforcement learning. Those skilled in the art will recognize that the claimed subject matter can be employed with respect to any suitable type of learning technique (e.g., supervised learning etc.) and all such types of learning technique(s) are intended to fall within the scope of the hereto appended claims.

Reinforcement Learning and the Thompson Strategy

Influence diagrams can be employed to facilitate decision making. Influence diagrams can either be constructed by an expert (typically with the aid of a decision analyst) and/or learned from data. Generally, supervised learning techniques for "ordinary" Bayesian networks apply easily (e.g., with little modification) to learn the structure and parameters of an influence diagram. If an influence diagram is going to be used repeatedly to make decisions, it is desirable to use resulting observed data to improve the model over time.

Figure 1:
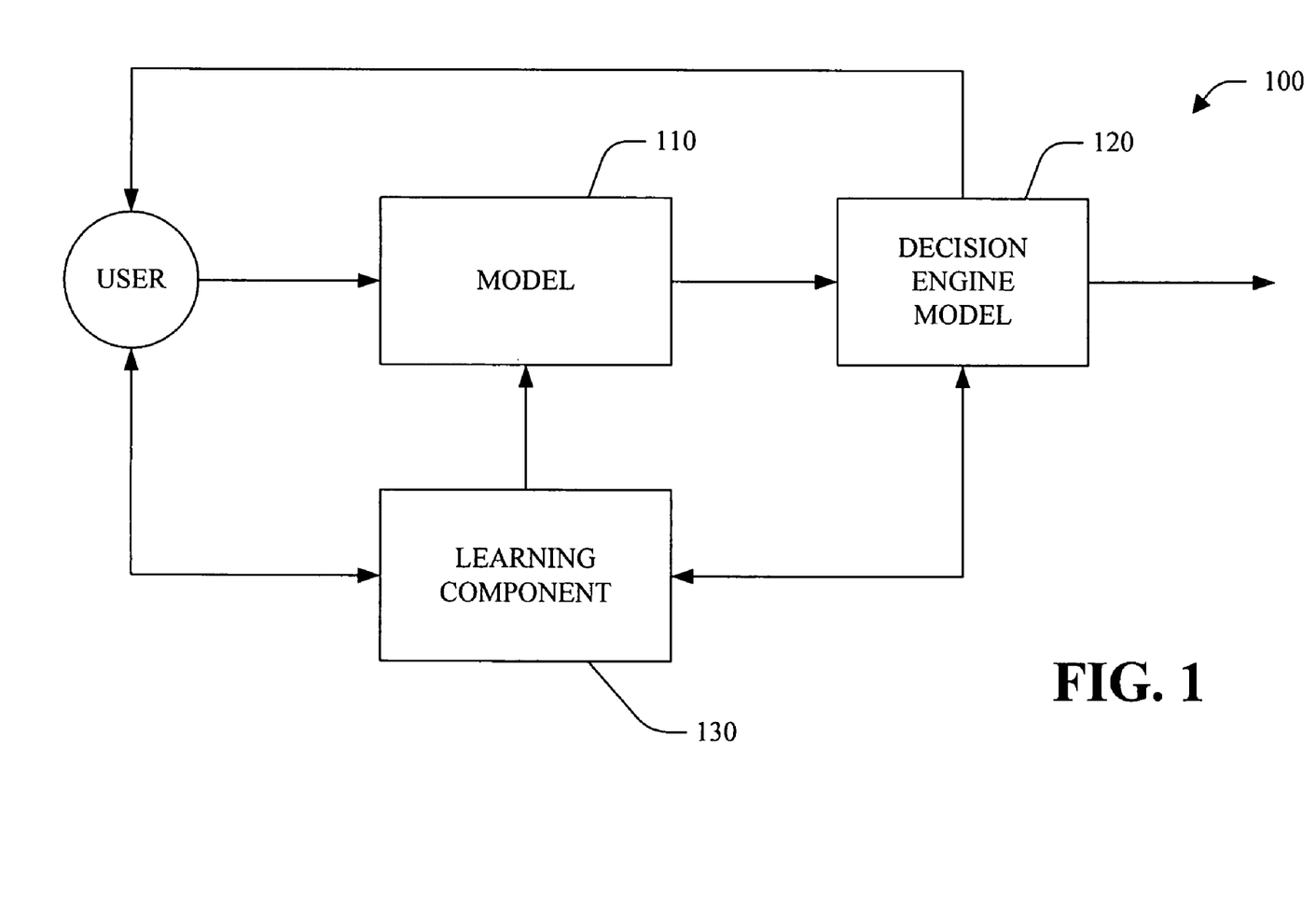
FIG. 1 is a block diagram of an online learning system.

Referring to FIG. 1, an online learning system 100 is illustrated. For example, the system 100 can be employed with reinforcement learning. Reinforcement learning deals with learning how to act in an environment. One of the central problems in reinforcement learning is deciding when to explore and when to exploit. In particular, given a current model of an environment 110 and given a model 120 about the expected (short-term) reward for performing each action in that state, the system 100 can "exploit" by performing the action that has the highest expected short-term reward. On the other hand, because the model 110 may be uncertain about the environment, the system 100 can instead choose to perform a sub-optimal action (with respect to the short term) in order to gain information and improve the models 110 and 120 for the long term.

In one example, a particular method for performing this explore-vs-exploit tradeoff is provided. Although the method is heuristic, it can be applied in a principled manner while simultaneously learning the parameters and/or structure of the model 110 (e.g., influence diagram model).

For example, if an influence diagram is going to be used repeatedly to make decisions, the resulting observed data can be used to improve the model over time. This can be important, for example, when the original parameter estimates are uncertain and/or when the domain itself is changing over time. If the decision maker is only interested in maximizing the immediate expected utility at each point in time, the maximum a posteriori (MAP) parameter values can be used and the resulting influence diagram can be solved. The parameters and/or structure of the influence diagram can be updated by performing incremental supervised learning techniques using the data observed after each decision.

On the other hand, if the decision maker is instead interested in maximizing long-term expected utility, the best action to take at any particular point in time can be sub-optimal in terms of immediate reward. The system 100 includes a model 130 which receives an input (e.g., from a user), for example, a speech input (e.g., raw voice signals) and outputs feature(s) (e.g., speech event(s)). The system 100 can further include a decision engine model 120 that receives the speech features and outputs an action to be taken. The decision engine model 120 can employ a probability distribution associated with uncertainty regarding parameters of the decision engine model 120. The decision engine model 120 an action based, at least in part, upon the probability distribution. The decision engine model 120 can employ a heuristic technique to maximize long term expected utility. The decision engine model 120 can determine whether to exploit the information known to it or to explore to obtain additional information. A learning component 130 can obtain additional information (e.g., feedback from a user) and update parameter(s) and/or the structure of the decision engine model 120.

The system 100 can be employed in scenarios in which an influence diagram is used to make repeated decisions and maximization of long-term expected utility is desired. The system 100 results in a model which is an interesting hybrid of two specific types of models that are studied in the reinforcement-learning community. In particular, the problem to be solved by the system 100 is similar to the classic N-armed bandit problem, except that each "pull" of a bandit corresponds to solving a generalization of a finite-horizon Markov decision process (MDP) (e.g., the influence diagram). Accordingly, the problem to be solved by the system 100 can be referred to as the Bandit ID (Influence Diagram) problem. For all but the most simple (long-term) utility functions, and for all but the most simple influence diagrams, the problem of identifying the optimal set of actions to take is intractable due to the uncertainty in the parameter values.

Those skilled in the art will recognize that researchers in adaptive control, experimental design, and reinforcement learning have used numerous heuristic explore-vs.-exploit strategies to solve N-armed bandit problems. One such strategy, originally due to W. R. Thompson (W. R. Thompson, On the likelihood that one unknown probability exceeds another in view of the evidence of two samples. *Biometricka*, 25:285-294 (1933)), is to choose actions stochastically based on the probability they are optimal (the Thompson strategy). This strategy has a number of appealing properties. First, it is easy to implement without approximations. Second, the strategy converges, in the limit of the number of observations in the environment, to the optimal policy. Finally, the approach is intuitively appealing as a reasonable strategy for interacting with the environment. In one example, the system 100 can apply the Thompson strategy to a Bandit ID problem.

Model

In this application, a variable is denoted by an upper case token (e.g., A, Θ) and a state or value of that variable is denoted by the same token in lower case (e.g., a, θ). Additionally, sets are denoted with bold-face capitalized tokens (e.g., A, Θ) and corresponding sets of values are denoted by bold-face lower case tokens (e.g., a, θ).

An influence diagram is a graphical model defined over a domain consisting of three types of variables: chance variables U, decision variables D, and value variables V. The influence diagram also contains a single utility function that is a deterministic function of all of the value variables. An influence diagram contains a set of parameters Θ that characterize the conditional distributions of the non-decision variables. In particular, the diagram defines the probability distribution p(U,V|D, Θ) via the local distributions stored within the non-decision nodes:

$$p(U, V|D, \Theta) = \prod_{X \in U \cup V} p(X|Pa(X), \Theta_X)$$

where Pa(X) denotes the set of parents for node X, and where ΘX denotes the subset of parameters in Θ that define the local distribution of X. Parents of a decision node D represent the nodes for which the values will be known at the time decision D is made.

Those skilled in the art will recognize that this definition of an influence diagram deviates from the traditional definition of an influence diagram because multiple value nodes are allowed that are not necessarily deterministic. The use of multiple stochastic value nodes is an optimization to allow efficient representation of a factored utility function (e.g., the utility is the sum of all the values nodes), and has been used by other researchers.

Figure 2:
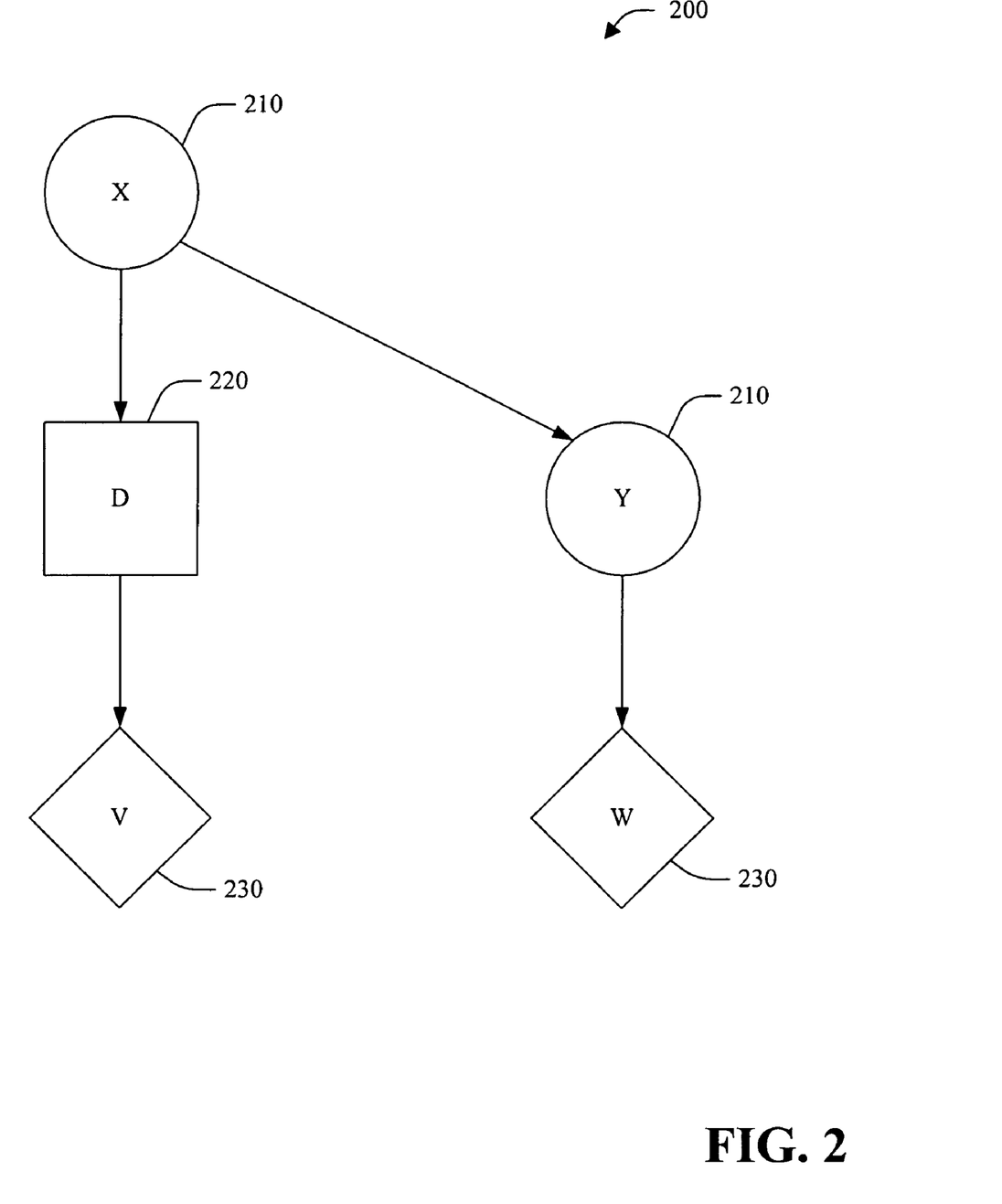
FIG. 2 is an influence diagram.

Referring briefly to FIG. 2, an exemplary influence diagram 200 is illustrated. In this example, circular nodes 210 represent chance variables, square nodes 220 represent decision variables, and diamond nodes 230 represent value variables.

If the parameters Θ of an influence diagram are known with certainty, well-studied inference techniques can be applied to "solve" for the optimal sequence of decisions represented in that diagram. In particular, corresponding to each setting θ of the parameters is an optimal policy Π(Θ) that prescribes, for each decision node in the influence diagram, what the best choice is as a function of the values of the observed variables. In one example, the policy Π(Θ) is not constructed explicitly, but rather as each decision needs to be made, an inference algorithm is run to determine the best action to take.

In one example, it is assumed that the parameters of the influence diagram are not known with certainty, but rather a prior probability distribution p(Θ) exists. Briefly, learning the parameters of an influence from observed data is a straightforward extension to the problem of learning the parameters of a Bayesian network; the only significant difference is that the joint distribution of interest in an influence diagram is one that is conditioned on a set of decisions.

In this example, the standard parameter-independence assumption from the Bayesian-network-learning community is made:

$$p(\Theta) = \prod_{X \in U \cup V} p(\Theta_X)$$

Note that the parameter-independence assumption implies that there is no "tying" of the parameters within an influence diagram. It is assumed that the influence diagram is going to be used repeatedly, and after each such decision instance, the parameter distribution is updated given the resulting observed values. $D_i$, $U_i$, and $V_i$ are used to denote the decision, chance, and value variables, respectively, in the ith decision instance. $D^n = \cup_{i=1}^n D_i$ is used to denote the union of all decision variables up through the nth decision instance; $U^n$ and $V^n$ is used to denote the corresponding unions for the chance and value variables, respectively. As in the case of learning Bayesian networks, it is assumed that the distribution p(U,V|D) is exchangeable, and thus all chance and value variables in the ith decision instance are independent of previous observations once Θ is known. Consequently, after n decision instances, $$p(\Theta|U^n, D^n, V^n)$$

can be calculated and this distribution can be used to determine the optimal policy for the next decision instance. In particular, if it is assumed that all values are observed in each decision instance, the posterior distribution in decision instance n+1 can be calculated efficiently using the MAP parameter values $\hat{\theta}$ from the posterior:

$$p(U_{n+1}, V_{n+1}|D_{n+1}, U^n, D^n, V^n) = p(U_{n+1}, V_{n+1}|D_{n+1}, \hat{\theta})$$

Thus, after n decision instances, if the MAP values of the parameter distribution can be computed, the (locally) optimal policy for decision instance n+1 can be identified by performing the well known inference algorithms under the assumption that the parameters are known to be equal to the MAP values.

Figure 3:
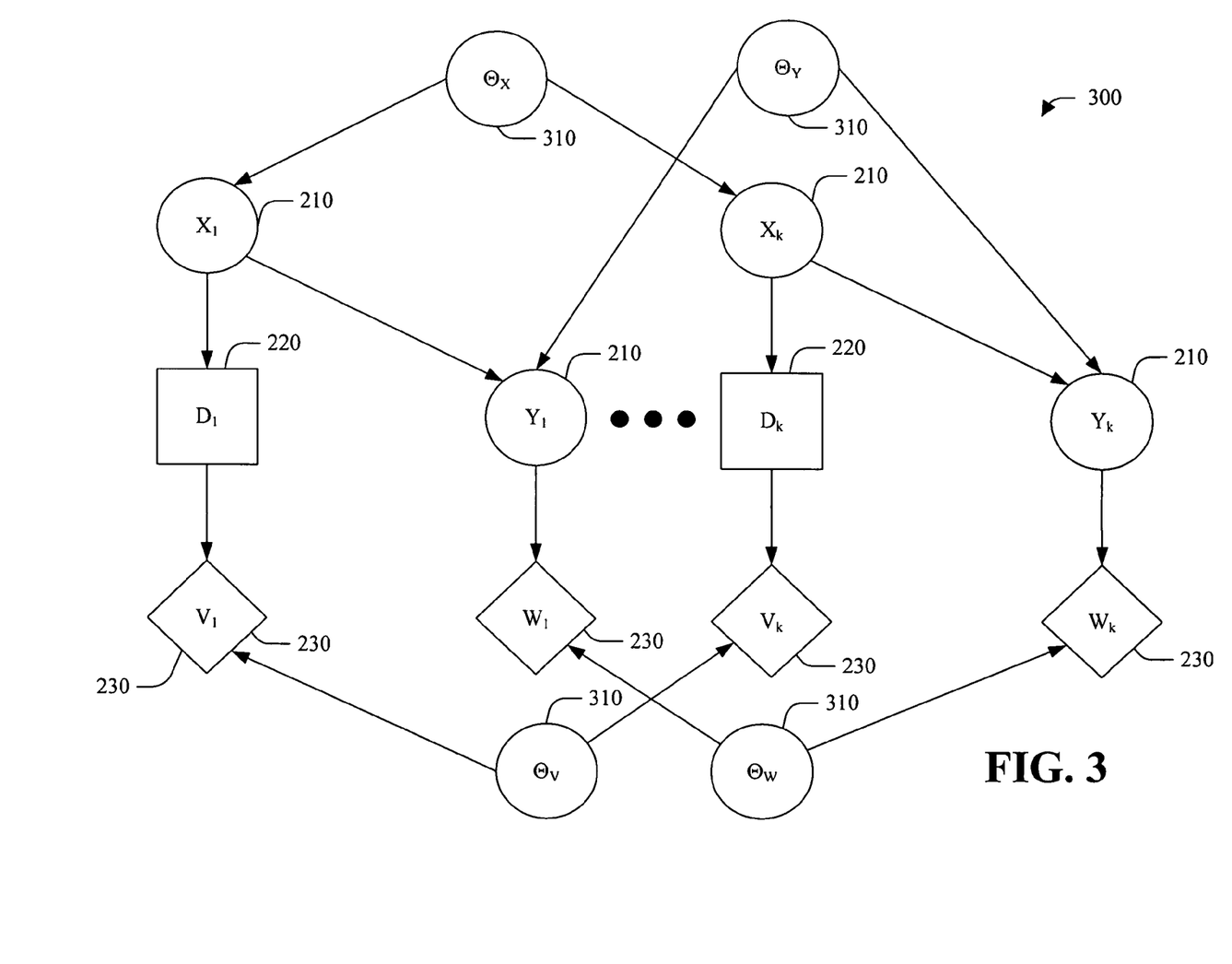
FIG. 3 is an expanded influence diagram.

Referring to FIG. 3, an expanded influence diagram 300 is illustrated. In this example, as is common in the literature on learning Bayesian networks from data, the influence diagram 300 has been expanded to include all of the instance-specific variables and to include explicit nodes 310 to represent the unknown parameters.

The N-armed bandit problem, a well-studied topic in many disciplines such as reinforcement-learning, is a simple example of the on-line influence-diagram learning problem. In the bandit problem, it is assumed that a person is gambling with n slot machines, where the ith slot machine pays a dollar with probability $\theta_i$. The person is uncertain about the payoff parameters, so it is desirable to construct a policy that, given n total pulls, maximizes the person's expected return. This problem exemplifies the classic "explore vs. exploit" problem that planning algorithms face. In particular, if the person is only interested in maximizing expected return on the next pull, it is easy to see that the optimal policy is to "exploit" the person's knowledge and play the machine with the highest expected return (e.g., play the machine for which the expected value of the payoff parameter is highest). Given k>1 remaining pulls, however, it may be better to "explore" by experimenting with a machine that may not have the highest expected return in order to gain more information about the corresponding payoff parameter; the idea is that by gaining information about the parameter values, the best machines to play in the long run can be identified with more certainty.

Assuming a beta prior for each $\theta_i$, if the number of pulls is bounded by k, the n-armed bandit problem can be solved exactly, assuming a desire to maximize the total payoff, using dynamic-programming techniques. When there are an infinite number of pulls remaining, the problem can be solved exactly in a similar manner, but only if it is desired to maximize a discounted total payoff (e.g., a dollar k turns from now is valued as $\delta^k$ dollars now). Even when exact methods are possible, oftentimes closed form solutions may not be feasible, so researchers often apply heuristic methods for solving these problems. Heuristic methods can also be preferred when the parameter values are changing over time; this corresponds to a violation of the exchangeability assumption described in the previous section.

The problem to be solved by the system 100 is a generalization of the N-armed bandit problem: each "pull" corresponds to implementing a strategy in an influence diagram—bandit ID problem. Just as in the n-armed-bandit problem, if the total return over multiple decision instances is of interest, the explore-vs-exploit dilemma is explored. Unfortunately, solving this dilemma exactly is infeasible in general, so heuristic or approximate algorithms are designed.

To summarize, based, at least in part, upon information received from a user, the model 130 can receive an input (e.g., raw voice signals) and output feature(s) (e.g., speech event(s)). The decision engine model 120 can receive the features and outputs an action to be taken. The decision engine model 120 can employ a heuristic algorithm with a probability distribution to determine whether to exploit information known to the model 120 or explore to gain additional information.

The heuristic algorithm can be based, for example, upon a description by Thompson (1933), supra, for selecting actions. Thompson (1933) was interested in how to allocate patients between the control arm and the treatment arm of a clinical trial. Thompson (1933) argued that in order to minimize a particular measure of risk, the fraction of patients assigned to the treatment group should be precisely the probability that the treatment arm of the clinical trial was optimal (e.g., the probability that the treatment would result in a better outcome for a patient). Thompson (1933) then derived a recursive formula for the probability that the treatment arm is optimal, assuming a Beta distribution over the treatment and control probabilities of success. In a later published article (Thompson, W. R. (1935), On the theory of apportionment, *American Journal of Math*, 57:450-456), Thompson generalized the derivation to the problem where there are n possible treatments.

The decision engine model 120 can employ this heuristic in order to select actions. There is clearly a strong connection between the problem Thompson studied and the n-arm bandit problem; the main difference is that Thompson was concerned with allocating all plays ahead of time, whereas in the bandit problem, the parameter distribution can be updated after each play. In this example, the following action-selection strategy can be employed (the Thompson strategy): choose each decision policy stochastically, choosing policy Π with probability that Π is optimal.

The Thompson strategy is not optimal for any cost function (such as the sum of all values) except in degenerate problems; this follows immediately for problems in which there is a unique optimal action for every decision because the Thompson strategy chooses actions randomly. The strategy does, however, have three properties that make it particularly attractive. First, the strategy is intuitively appealing. Second, in one example, the strategy can be implemented exactly without any approximation. Finally, as the posterior distributions over the parameters become more and more peaked, the strategy correctly converges to the optimal "exploit only" strategy.

Researchers in the reinforcement learning field have applied the Thompson strategy to a variety of bandit problems. Similar to Thompson (1933), the researchers have also derived the probability that the payoff for each machine is optimal assuming a Beta parameter prior. Thus, this research showed that the Thompson strategy is superior to many other simple explore-vs.-exploit strategies found in the reinforcement-learning literature.

Yet other researchers have applied the Thompson strategy for action selection in a model-free reinforcement-learning problem, using a Bayesian approach to Q-learning. These researchers recognized that although deriving the probability that each decision is optimal may be difficult, sampling decisions according to this distribution is simple. Unlike the bandit problems considered by other researchers, these researchers found that the Thompson strategy did not perform particularly well compared to some alternative strategies.

With regard to implementation of the Thompson strategy, recall that if the parameter values θ of an influence diagram are known, optimal performance at each step can be achieved by simply performing the unique optimal decision policy Π(θ) in each decision instance. It follows that the probability any particular policy Π is optimal is:

$$p_{opt}(\Pi) = \int_{\theta s.t. \Pi(\theta) = \Pi} p(\theta)$$

In other words, the probability that a policy is optimal is equal to the total prior probability mass over the set of parameters that result in that policy being optimal. This means that by simply sampling parameters from their probability distribution and solving for the optimal policy, the decision engine model 120 can select policies based on the probability that they are optimal. Furthermore, in order to facilitate sampling from p(θ), the variable-specific parameter distributions can be modeled as Dirichlet or normal-Wishart distributions, which are the typical choices for discrete and continuous variables, respectively, when learning Bayesian networks.

It can be observed that in the limit of the number of decision instances, the Thompson strategy for policy selection converges to the optimal policy. In particular, any policy with non-zero probability will eventually be tried a sufficient number of times to deem that it is or is not the best policy.

An unfortunate property of the Thompson strategy—and of almost all the standard explore-vs.-exploit strategies in the literature—is the fact that the strategy does not use the number of remaining decision instances in its choice for the next action. If there is only one more decision instance, it would be preferred to use the MAP parameter values as opposed to a random sample. Thus, in one example, the decision engine model 120 can artificially decrease the variance of the parameter distributions as the last decision instance is approached (e.g., using the Dirichlet and normal-Wishart distributions).

As discussed previously, heuristic strategies such as the Thompson strategy are often applied even when an optimal strategy can be computed because the parameters may be changing over time. In one example, non-stationary parameters can be a problem for the Thompson strategy if the variances of the parameter distributions get too low. This can be mitigated by artificially keeping these variances large enough that exploration continues so that the model can adapt.

It is to be appreciated that the system 100, the model 110, the decision engine model 120 and/or the learning component 130 can be computer components as that term is defined herein.

Online Learning for Dialog System

Figure 4:
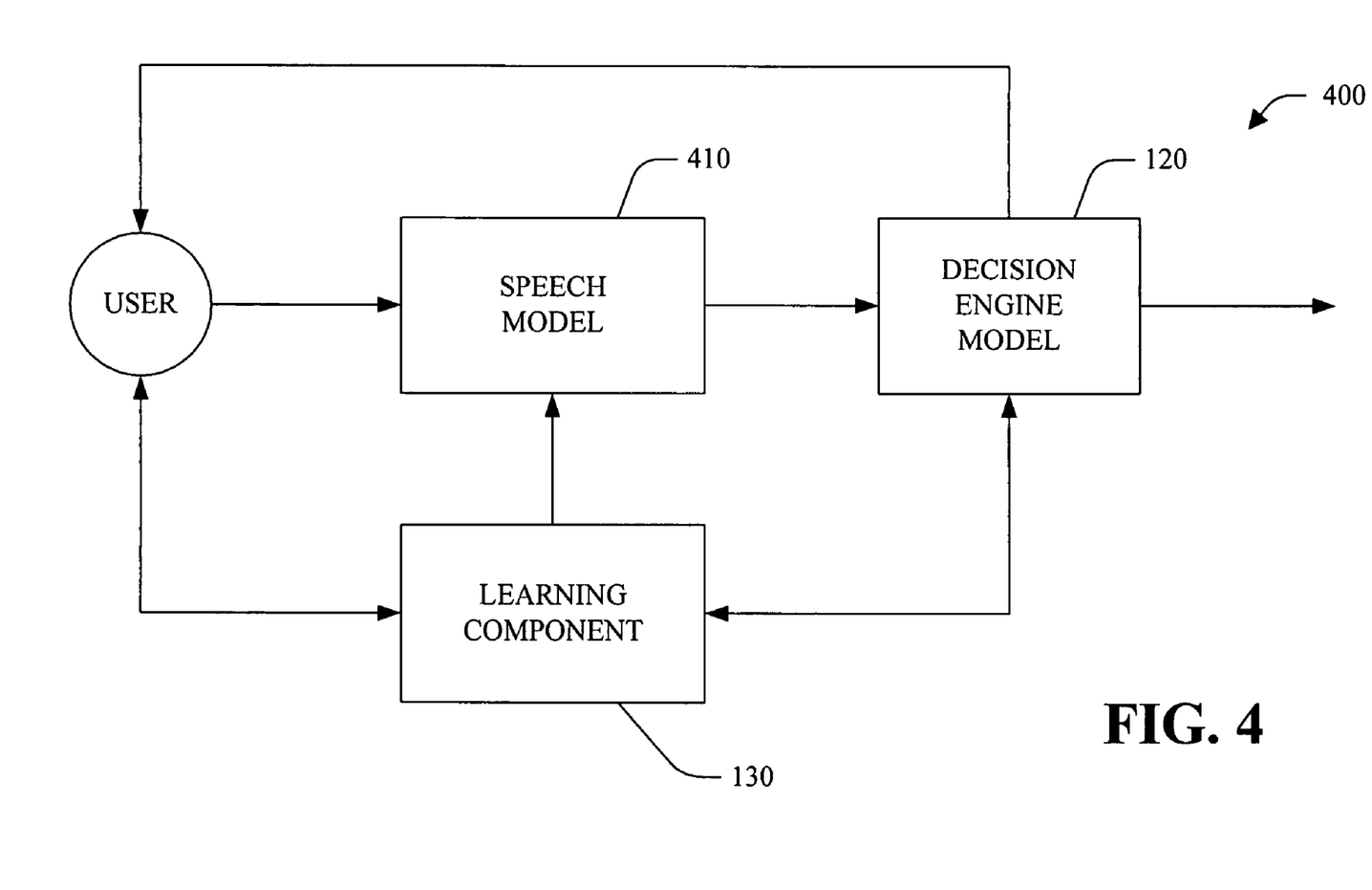
FIG. 4 is a block diagram of an online learning dialog system.

Referring to FIG. 4, an online learning dialog system 400 is illustrated. The system 400 can be employed to recognize spoken dialog (e.g., voice-controlled web browser and/or voice-controlled remote control) using a speech model 410 (e.g., model 110). The system 400 can be applied to implement a spoken dialog system for a voice-enabled browser (Accessibility Browser). In this example, the browser functions just like any other web browser, except that it responds to command-and-control speech recognition. For example, to go back to a previous web page, the user issues the voice command "go back" or "previous page". In the spoken-dialog system 400, every utterance produced by the speaker can either be accepted as understood, and consequently the corresponding action is taken (e.g., exploit), or the utterance can be deemed ambiguous and in need of clarification (e.g., explore). When the system 400 does not understand an utterance, the system 400 can initiate a repair dialog, using one of two methods for clarification via the decision engine component 120: it can ask for a repeat ("Can you repeat that?") or for a confirmation ("Did you say X or Y?"). Repair dialogs are particularly important in noisy environments when speech recognition is often inaccurate.

Researchers in the reinforcement-learning community have noted that spoken-dialog interaction entails sequential decision-making that can be modeled as a MDP. Further, researchers have demonstrated that an automated system adopting the policy for the MDP works as well as a hand-trained model. Similar to previous research, the Accessibility Browser described herein uses an influence diagram, which is a generalization of a three-step MDP, to control actions. However, unlike previous systems, the policy is adapted in an online fashion, as described in the previous section, based on data the system 400 collects as it interacts with the user.

Figure 5:
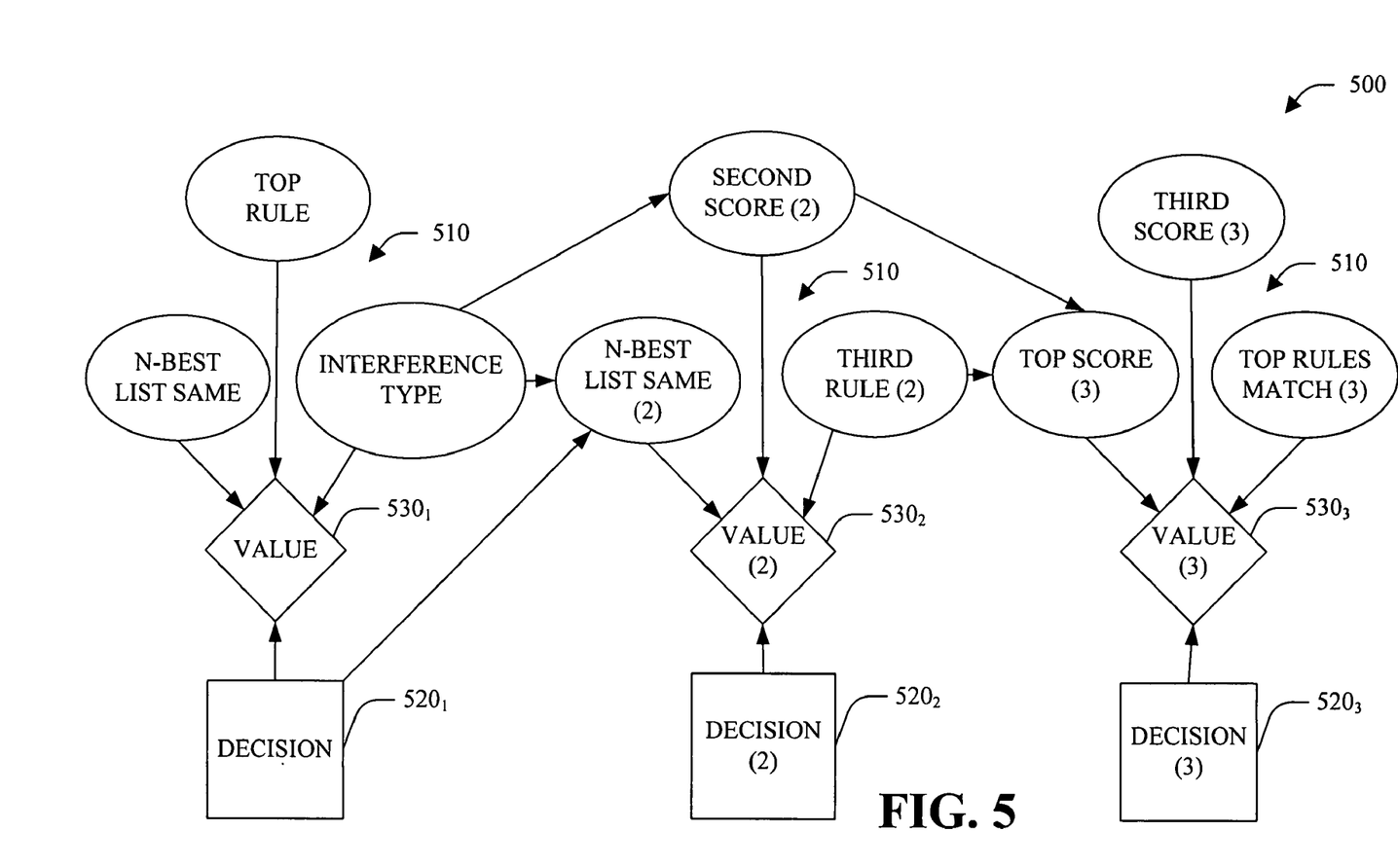
FIG. 5 is an influence diagram.

Turning to FIG. 5, an influence diagram 500 is illustrated. The influence diagram 500 can be employed, for example, as a baseline model for the Accessibility Browser. For readability, only a subset of the chance variables 510 is depicted in FIG. 5. The "information arcs" that are directed into the decision nodes 520 are left implicit. Additionally, like in an MDP, chance variables 510 in the current and previous steps and previous decision variables 520 are known before the current decision is made. The step number corresponding to a node is indicated by the name of the node. For example, "Top Score (3)" is a chance node that is observed in the third step of the influence diagram. In one example in all time steps, the chance nodes 510 are Microsoft Speech API (SAPI) output variables—or functions of those variables—that the learning algorithm deemed predictive of the value nodes 530; these variables are generated by the API whenever a speech event is recognized. As depicted in FIG. 5, these variables included: what the top recognized grammar command was in the first step (Top Rule), what the lattice score for the recognized phrase was in the third step (Top Score (3)), whether the n-best recognitions all correspond to the same command (N-Best List Same and N-Best List Same (2)), and whether the top command in the third step was the same as the top command in the second step (Top Rules Match (3)). In this example, in all, there were eight chance nodes in the first step, four chance nodes in the second step, and four chance nodes in the third step. Chance nodes were both discrete (e.g., Top Rule) and continuous (e.g., Top Score (3)).

In this example, in the first time step, the decision node "Decision" $520_1$ comprises four actions that can be taken by the decision engine model 120 in response to a recognized utterance:

(1) ignore the utterance (Ignore),
(2) execute the action corresponding to the most likely command (DoTop),
(3) ask the user to repeat the command (Repeat), or
(4) show a numbered list of the three most likely commands, together with the choices "None of the above" and "I didn't say anything" (Confirm).

The value node "Value" $530_1$ in the first time step represents the immediate reward as a result of the decision: if the system 400 correctly ignores the user or if the system 400 executes the correct command, then Value=100; if the system 400 incorrectly ignores the user or if the system 400 executes the wrong action, then Value=−100; if the system 400 executes a repair action (either Repeat or Confirm), the Value is set to a user-configurable value between −100 and 100 that indicates the user's preferences about the repairs.

If the action taken in the first time step is either Repeat or Confirm, the system 400 proceeds to the second time step, where it will either try to recognize the command again or try to recognize an integer, respectively. Via the learning component 130, the decision node "Decision (2)" $520_2$ is the same as "Decision", except that the system 400 is not allowed to perform Ignore, and if the first action was Confirm, the system 400 may not perform a second Confirm (e.g., the system 400 is not allowed to provide a numbered list of integers and ask the user to indicate, using an integer, what the previous integer was). The value node "Value (2)" $530_2$ is the same as in the previous time step.

In the final time step, which is reached when the system 400 performs either a Repeat or a Confirm in the second time step, the decision node "Decision (3)" $520_3$ only has two possible actions: execute the most likely command (DoTop) or give up with an apology to the user (Bail). The value node "Value (3)" $530_3$ is the same as the previous value nodes, but where an action of Bail is equivalent to performing the wrong command results in a value of −100.

Finally, the total utility of an entire dialog session is defined as the sum of the value nodes in the dialog, except that if a time step was not entered (due to performing a DoTop action), the corresponding value node did not contribute any value. At each time step, the system 400 performs inference in the influence diagram to determine the best action to take. As described above, there are many well-studied algorithms to do this; for simplicity (in one example, the system 400 can perform inference by forward sampling.

In this example, the conditional probability distributions in the model 410 are all decision trees, where the leaf distributions are either (1) multinomial distributions with Dirichlet parameter priors, or (2) Gaussian distributions with normal-Wishart parameter priors, depending on whether the target variable is discrete or continuous, respectively. As the user interacts with Accessibility Browser, the parameter distributions are updated as described in the previous section. Importantly, the browser can be designed such that whenever the dialog enters a particular time step, the system 400 observes all variables in that time step; due to the parameter-independence assumption and the structure of the influence diagram, if the system 400 does not observe any of the variables in a time step, a closed-form representation for the posterior $p(\Theta)$ is still available for the next decision instance.

The only problematic variables in terms of complete data are the value variable 530. In this example, in order to ensure the method by which each value variable is observed within each step of the dialog, the system 400 allows the user to provide explicit negative feedback whenever the system 400 performs the wrong action. For example, if the user command was "go back" and the system 400 executes the "go home"

browser command, then the user can say "Bad Browser!" or "Wrong!" to indicate that the system 400 made a mistake. In this example, it is assumed that the correction commands can be recognized by SAPI without error, and thus confirmations or repeats of these corrections are not employed. If the user does not correct the browser within a threshold period (e.g., five seconds) after a command is executed, the system 400 can assume that the command is correct.

Given observations for the value nodes 530, and in particular, given observations for the success or failure of dialog commands, there are many opportunities to update parameter distributions corresponding to actions that were not actually taken by the browser. For example, suppose that in the first time step, the browser executes a Confirm action, and then successfully recognizes that the second command in the top-n list is the correct one. In this case, the system 400 recognizes that, in retrospect, had it executed a DoTop action in the first time step (e.g., had it performed the first command in the top-n list), it would have executed the wrong command. As a result of these retrospective analyses, each dialog session can lead to updates of many of the (independent) parameter distributions.

It is to be appreciated that the system 400 and/or the speech model 410 can be computer components as that term is defined herein.

Figure 6:
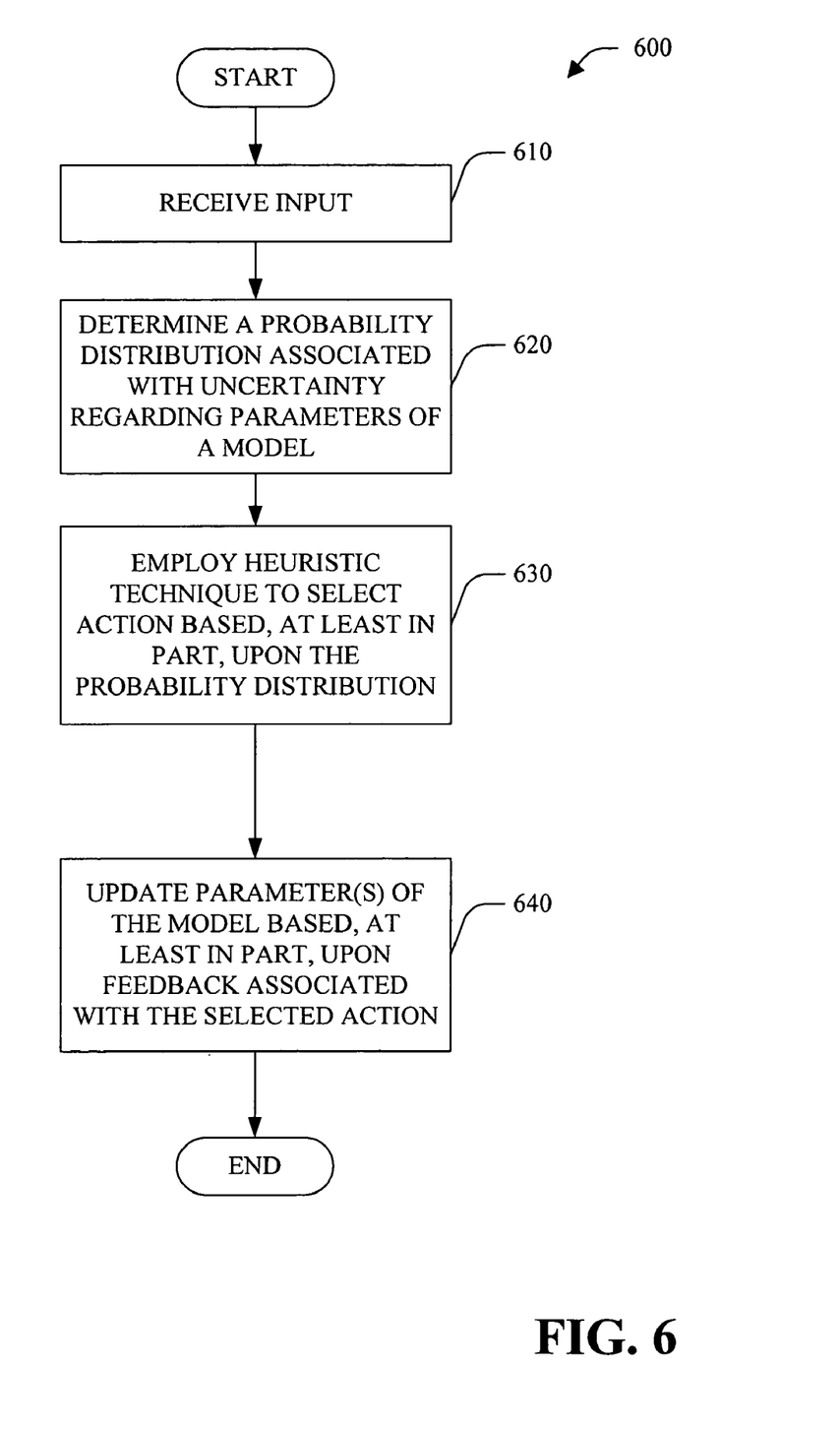
FIG. 6 is a flow chart of a method that facilitates online learning.
Figure 7:
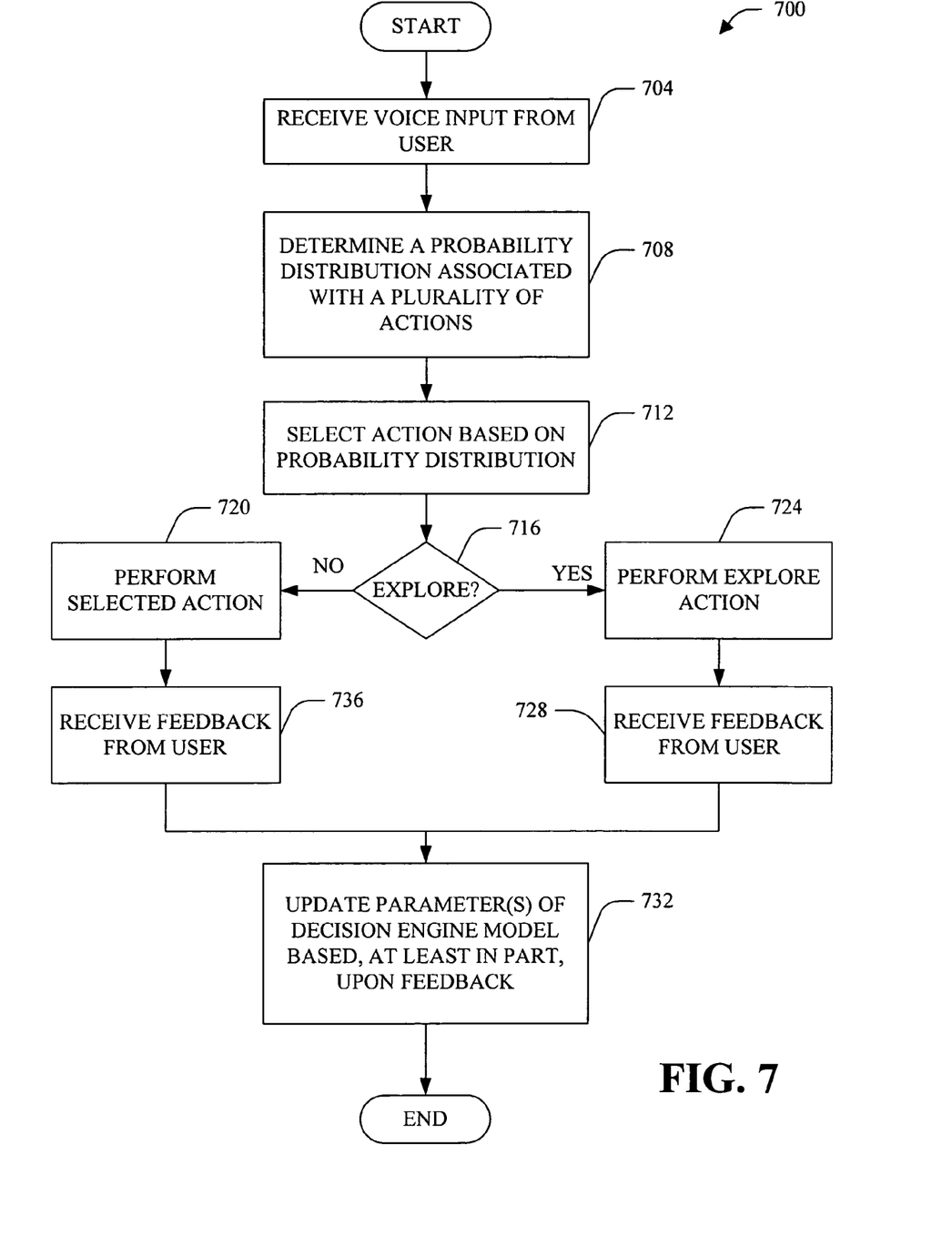
FIG. 7 is a flow chart of an online learning dialog method.

Turning briefly to FIGS. 6 and 7, methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 6, a method that facilitates online learning 600 is illustrated. At 610, an input is received, for example, from a user. At 620, a probability distribution associated with uncertainty regarding parameters of a model (e.g., decision engine model 120) is determined. At 630, using the probability distribution, a heuristic technique (e.g., Thompson strategy) is employed to select an action. At 640, parameter(s) of the model (e.g., decision engine model 120) are updated based, at least in part, upon feedback associated with the selected action.

Turning to FIG. 7, an online learning dialog method 700 is illustrated. At 704, a voice input is received from a user. At 708, a probability distribution associated with a plurality of actions is determined. At 712, an action is selected based on the probability distribution.

At 716, a decision is made as to whether an explore action (e.g., "repeat" or "confirm") has been selected. If the decision at 716 is NO, processing continues at 720. If the decision at 716 is YES, at 724, the explore action is performed. At 728, feedback is received from the user. For example, the feedback can include negative feedback such as "bad" or "no" and/or no action within a threshold period of time (e.g., no user reaction within five seconds). At 732, parameter(s) of the decision engine model are adjusted based on the feedback (or lack thereof), and, no further processing occurs.

At 720, the selected explore action is performed. At 736, feedback is received from the user and processing continues at 732.

Figure 8:
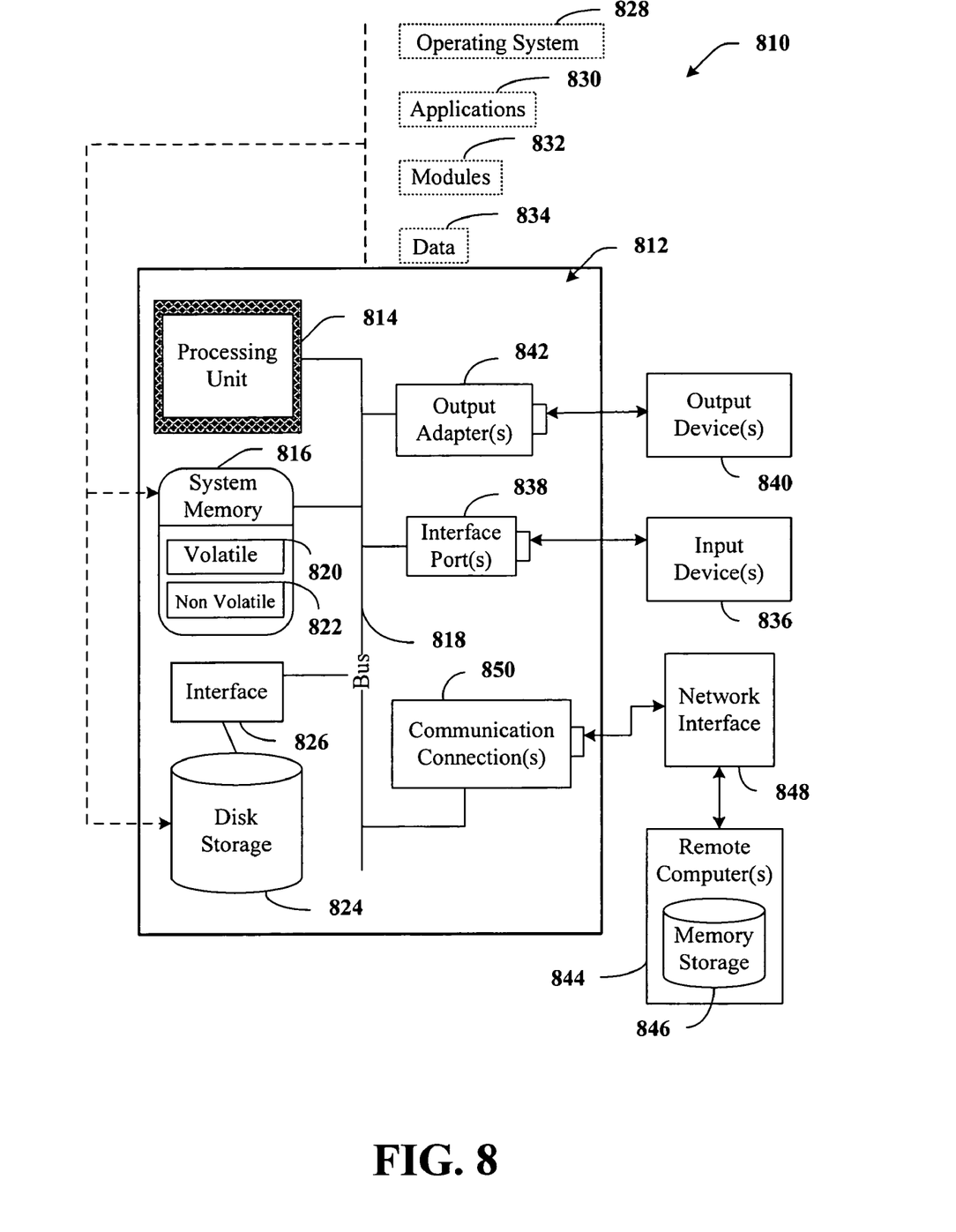
FIG. 8 illustrates an example operating environment.

In order to provide additional context for various aspects of the claimed subject matter, FIG. 8 and the following discussion are intended to provide a brief, general description of a suitable operating environment 810. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the claimed subject matter can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An online learning dialog system comprising:

one or more processing units;

memory communicatively coupled to the one or more processing units, the memory having stored instructions that, when executed by the one or more processing units, configure the online learning dialog system to implement:

a speech model that receives a speech input and provides speech events;

a decision engine model that receives the speech events from the speech model and selects an action based, at least in part, upon a probability distribution, the probability distribution being associated with uncertainty regarding a plurality of parameters of the decision engine model applied to the speech input, wherein the probability distribution is:

defined by an influence diagram that is configured to maximize long term expected utility and apply the Thompson strategy; and expressed as:

$$p(U, V|D, \Theta) = \prod_{X \in U \cup V} p(X|Pa(X), \Theta_X)$$

where U denotes chance variables, D denotes decision variables, and V denotes value variables;

where Pa(X) denotes a set of parents for node X; and where $\Theta_X$ denotes a subset of parameters related to the applied speech input in $\Theta$ that define local distribution of X; and, a learning component that in an online manner modifies at least one of the parameters of the decision engine model based upon feedback associated with the selected action, wherein the feedback comprises a lack of verbal input from a user of the system or an environment within a predefined period of time.

2. An online learning dialog method implemented at a computing device, the method comprising:
 receiving, at the computing device, voice input from a user;
 determining, at the computing device, whether the voice input from the user is accepted as understood and initiate corresponding actions or the voice input is ambiguous and is in need of exploration based at least on a probability distribution associated with uncertainty regarding parameters of a decision engine model applied to the voice input, wherein the probability distribution is defined by an influence diagram that is configured to apply the Thompson strategy;
 selecting an action based, at least in part, upon the probability distribution;
 receiving, at the computing device, feedback associated with the selected action; and
 updating at least one of the parameters of the decision engine model based, at least in part, upon the feedback associated with the selected action such that the decision engine model of the computing device is configured to maximize long term expected utility via the updating at least the one of the parameters of the decision engine model, wherein the feedback comprises a lack of verbal response to the selected action in a threshold period of time.

3. A voice-controlled mobile device that comprises the system of claim 1.

4. A speech application embedded on a non-transitory computer storage medium to implement the method as recited in claim 2.

5. The system of claim 1, wherein the instructions that, when executed by the one or more processing units, configure the online learning dialog system to further implement a repair dialog on a display of the system.

6. The system of claim 5, wherein the repair dialog includes a request to repeat and/or a request for confirmation.

7. The system of claim 1, wherein the speech model is configured to:
 ignore the speech input,
 execute corresponding to a most likely command associated with the speech input,
 request to repeat the speech input, and
 provide information associated with a plurality of likely commands along with a request to confirm the speech input.

8. The system of claim 1, wherein the feedback further comprises a negative input or a positive input utterance from the user of the system or the environment.

9. The system of claim 1, wherein the plurality of parameters of the decision engine model are updated based on the feedback associated with the selected action.

10. The system of claim 1, wherein the learning component employs retrospective analysis to modify at least one of the plurality of parameters of the decision engine model.

11. The system of claim 1, wherein the feedback comprises a lack of an input from a user of the system within a threshold period of time.

12. The system of claim 1, wherein the decision engine model comprises a Markov decision process.

13. The system of claim 1, wherein:
 Dirichlet priors are used in the plurality of parameters for conditional distributions of discrete variables of the decision engine model, and
 Normal-Wishart priors are used in the plurality of parameters for distributions of continuous variables of the decision engine model.

14. An online learning dialog system comprising:
 means for receiving voice input;
 means for modeling the voice input based on a probability distribution associated with uncertainty regarding a plurality of parameters of the means for modeling the voice input, wherein the probability distribution is defined by an influence diagram that is configured to apply the Thompson strategy;
 means for selecting an action based, at upon in part, upon the probability distribution received from the means for modeling the voice input; and
 means for modifying the plurality of parameters of the means for modeling the voice input based upon feedback associated with the selected action, wherein the feedback comprises a lack of verbal response from a user in a threshold period of time.

15. The system of claim 14, wherein the means for selecting an action employs a heuristic technique to maximize long term expected utility.

16. A voice-controlled web browser embedded on a non-transitory computer storage medium to implement the method as recited in claim 2.

17. The method of claim 2, wherein the feedback further comprises a verbal response to the selected action in a threshold period of time.

18. A computer readable medium having stored thereon computer executable instructions for carrying out the method of claim 2.

* * * * *